(12) United States Patent
Chang et al.

(10) Patent No.: US 10,247,983 B2
(45) Date of Patent: Apr. 2, 2019

(54) LIGHT CONVERSION FILM FOR BACKLIGHT MODULE, BACKLIGHT MODULE AND DISPLAY DEVICE

(71) Applicant: Shenzhen China Star Optoelectronics Technology Co., Ltd., Shenzhen, Guangdong (CN)

(72) Inventors: Jianyu Chang, Guangdong (CN); Yung-jui Lee, Guangdong (CN); Yu-chun Hsiao, Guangdong (CN); Sheng-Jer Chang Chien, Guangdong (CN); Zanjia Su, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 9 days.

(21) Appl. No.: 15/559,966

(22) PCT Filed: Jul. 14, 2017

(86) PCT No.: PCT/CN2017/092927
§ 371 (c)(1),
(2) Date: Sep. 20, 2017

(87) PCT Pub. No.: WO2018/201610
PCT Pub. Date: Nov. 8, 2018

(65) Prior Publication Data
US 2018/0321526 A1 Nov. 8, 2018

(30) Foreign Application Priority Data
May 4, 2017 (CN) .......................... 2017 1 0309556

(51) Int. Cl.
*F21V 8/00* (2006.01)
*G02F 1/1335* (2006.01)
*G02F 1/13357* (2006.01)

(52) U.S. Cl.
CPC ......... *G02F 1/1336* (2013.01); *G02B 6/0055* (2013.01); *G02F 2001/133614* (2013.01)

(58) Field of Classification Search
CPC ....... G02F 1/1336; G02F 2001/133614; G02B 6/0055
See application file for complete search history.

(56) References Cited

U.S. PATENT DOCUMENTS 9,267,664 B2 * 2/2016 Chen ........................ F21V 9/08
2015/0188082 A1 7/2015 Rohatgi

FOREIGN PATENT DOCUMENTS

CN 203519970 A 4/2014
CN 103791332 A 5/2014
(Continued)

*Primary Examiner* — Mary Ellen Bowman
(74) *Attorney, Agent, or Firm* — Andrew C. Cheng

(57) ABSTRACT

A light conversion film for a backlight module, a backlight module and a display device are disclosed. The backlight module includes a light source that emits at least a first light; a light conversion film that receives the first light, converts the first light into a second light and emits the second light such that a light emission angle of the backlight module is greater than 120 degrees and a color temperature is less than 15000. The present invention can increase a brightness viewing angle to reach 120 degrees. Besides, the light conversion film has a higher light excitation efficiency, capable of decreasing the color temperature of the backlight module, and enhances the display effect.

19 Claims, 2 Drawing Sheets

(56) References Cited

FOREIGN PATENT DOCUMENTS

| | | |
|---|---|---|
| CN | 103917000 A | 7/2014 |
| CN | 105259601 A | 1/2016 |
| CN | 105609618 A | 5/2016 |
| CN | 105911766 A | 8/2016 |
| CN | 206057759 A | 3/2017 |
| CN | 107121723 A | 9/2017 |
| CN | 107121841 A | 9/2017 |
| CN | 206848647 A | 1/2018 |
| CN | 206848649 A | 1/2018 |

\* cited by examiner

LIGHT CONVERSION FILM FOR BACKLIGHT MODULE, BACKLIGHT MODULE AND DISPLAY DEVICE

BACKGROUND OF THE INVENTION

1. Field of the Invention

The present invention relates to a liquid crystal display technology field, and more particularly to a light conversion film for a backlight module, a backlight module and a display device.

2. Description of Related Art

The Liquid Crystal Display (LCD) has features of thin, low power-consumption and no radiation so that the LCD has become a leading position of a flat display field. Currently, the LCD has be applied in a HD digital TV, desktop computer, tablet, notebook, cell phone and digital camera, etc.

In the backlight source used by the current LCD, most light source is LED. Using a side-light type as an example, the light emitted from the light source enters a light guide plate, and through mesh nodes at a bottom of the light guide plate, the light is evenly extracted. A certain number of optical films are disposed on an upper surface of the light guide plate for shielding mura or increasing the brightness. In a long time research of the inventor of the present application, although the current design can greatly increase the display brightness, but a viewing angle will loss. Specifically, when viewing the LCD from a side edge, original colors of the picture cannot be observed, even only a full white or full back can be observed. That is, the insufficient viewing angle problem is generated. Along with the increasing size of the LCD, a probability that viewing the display at a side edge becomes bigger. Accordingly, a wide viewing angle display device is required to be developed.

SUMMARY OF THE INVENTION

The technology problem mainly solved by the present invention is to provide a light conversion film, a backlight module and a display device, which can make the display device to have a wider viewing angle in order to reach a better display effect.

In order to solve the above technology problem, a technology solution adopted by the present invention is: providing a light conversion film for a backlight module, comprising: a quantum dot material and/or a fluorescent material; and multiple scattering particles, wherein the light conversion film receives a first light, converts the first light into a second light and emits the second light such that a light emission angle of a backlight module is greater than 130 degrees, a color temperature is less than 12000 and a contrast ratio is greater than 2000:1.

In order to solve the above technology problem, another technology solution adopted by the present invention is: providing a backlight module, comprising: a light source that emits at least a first light; a light conversion film that receives the first light, converts the first light into a second light and emits the second light such that a light emission angle of the backlight module is greater than 120 degrees and a color temperature is less than 15000.

In order to solve the above technology problem, another technology solution adopted by the present invention is: providing a display device including the above backlight module.

The beneficial effect of the present invention is: comparing to the conventional art, the present invention provides a backlight module including a light conversion film, the light conversion film can make an emitting light to be emitted outward in an isotropic manner in order to increase an emitting angle of the backlight module, increase the viewing angle of the display device to be above 120 degrees. Besides, the light conversion film has a higher light excitation rate, which can decrease the color temperature of the backlight module, and increase the display effect.

DETAILED DESCRIPTION OF THE PREFERRED EMBODIMENT

In order to make the purpose, the technology solution and effect to be clearer and more specific, the following will refer to the figures and adopt embodiments to describe the present invention in detail.

Figure 1:
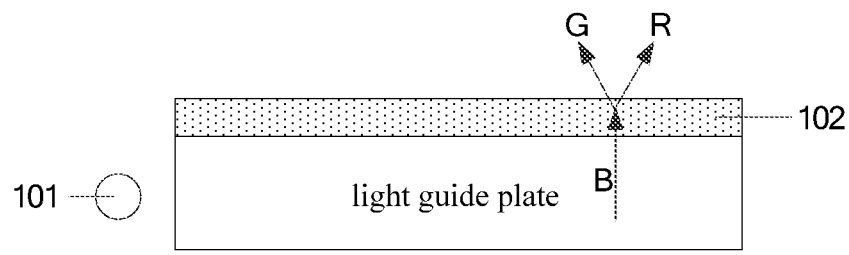
FIG. 1 is a schematic diagram of a backlight module according to an embodiment of the present invention.

With reference to FIG. 1, FIG. 1 is a schematic diagram of a backlight module according to an embodiment of the present invention. The present invention provides a backlight module for providing a backlight source to a display device. The backlight module includes: a light source 101 and an optical film 102.

The light source 101 is a point light source, a line light source or a surface light source, which can emit a first light. The light source 101 can be an LED (Light Emitting Diode) lamp, and the LED lamp can emit a variety of colors of light such as an ultraviolet light or a blue light. In another embodiment, the backlight source can be another light-emitting chip.

Figure 2:
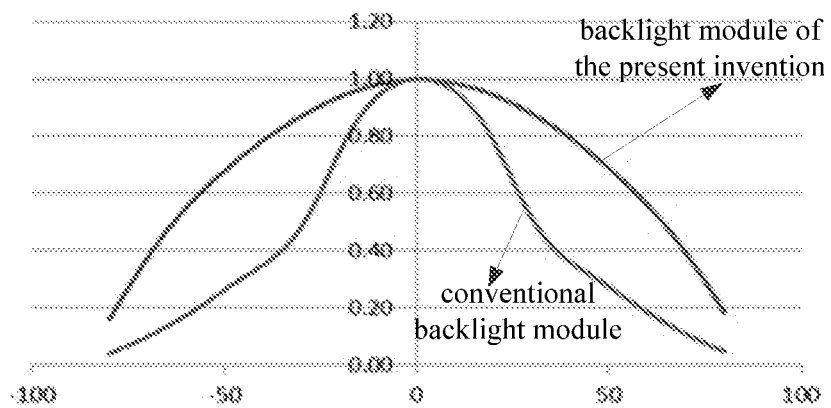
FIG. 2 is a comparison diagram of viewing angle of a conventional backlight module and a backlight module of the present invention.

With reference to FIG. 2, and FIG. 2 is a comparison diagram of viewing angle of a conventional backlight module and a backlight module of the present invention. The optical film (a light conversion film) 102 receives the first light, converts the first light into a second light and emits the second light such that a light emission angle of the backlight module is greater than 120 degrees and a color temperature of the backlight module is less than 15000. Optionally, the first light is an ultraviolet light or a blue light. The second light is a yellow light, or a mixed light of a green light and a red light, or a mixed light of a blue light, a green light and a red light.

Wherein, the light conversion film 102 includes a light conversion material, and the light conversion material is a photoluminescence material, which can make an emitting light to be emitted outwardly in an isotropic manner such that a brightness viewing angle of the backlight module is greatly increased to reach 120 degrees, 130 degrees, 140 degrees, 150 degrees, and 170 degrees. Accordingly, a wide viewing angle requirement is satisfied so that the display device can reach a wide viewing angle effect.

Wherein, a concentration of the light conversion material in the light conversion film 102 is in a range of 0.05%~38%. Wherein, the concentration can be a mass concentration or a volume concentration. The specific composition can be deployed according to a material, a density, a particle size, or a material of substrate material. In another embodiment, the concentration can also be a mass concentration or a volume concentration. Along with the increase of the concentration of the light conversion material, the color temperature of the backlight module is decreased. Therefore, in order to decrease the color temperature of the backlight module, the concentration of the light conversion material can be increased appropriately. For example, the concentration of the light conversion material can be 0.05%, 0.7%, 3%, 8%, 13%, 26% and 38%, etc. Accordingly, the color temperature of the backlight module can be decreased to be 12000, or below 10000 such as 8000 or 6000, etc.

Optionally, in one embodiment, the backlight module provided by the present application can has a large viewing angle, and a low color temperature at the same time, and the contrast ratio can be greater than 2000:1 such as 2000:1, 4000:1 or 6000:1.

Optionally, in one embodiment, the light conversion film 102 further includes multiple scattering particles, a particle diameter of each of the scattering particles is in a range of 0.5 microns~6.5 microns; the concentration of the scattering particles in the light conversion film 102 is in a range of 0.05%~47%; a concentration ratio of the light conversion material to the scattering particles is in a range of 1:1~1:10.

Specifically, each of the scattering particles can be an appropriate optical material in the present field such as a glass hollow bead or a polymer particle. The particle diameter of each scattering particle is in a range of 0.5 microns~6.5 microns, such as 0.5 microns, 1.3 microns, 2.7 microns, 4.1 microns, 5.6 microns, or 6.5 microns. Wherein, a material having a greater density can be used as the scattering particle. The scattering particle having the greater density will sink to a bottom portion, which is closer to the light source. The kinds and the particle diameter in a same light conversion film 102 can be the same or be different. A concentration ratio of the light conversion material to the scattering particles is in a range of 1:1~1:10 such as 1:1, 1:2, 1:4, 1:6, 1:8, and 1:10. The backlight module can has a lower color temperature through adjusting a concentration ratio of the light conversion material to the scattering particles.

Optionally, in one embodiment, the light conversion film 102 includes a light conversion material layer. A thickness of the light conversion material layer is 53 microns~162 microns. Along with the increase of the thickness of the light conversion material layer, a color temperature of the backlight module is decreased. Therefore, in order to decrease the color temperature of the backlight module, the thickness of the light conversion material layer can be increased appropriately such as 53 microns, 88 microns, 114 microns, 131 microns, 144 microns, or 162 microns. Besides, the affections of the concentration of the light conversion material, the thickness of the light conversion material layer and the concentration of the scattering particle to the color temperature can be considered. For example, the concentration of the light conversion material can be 3%, the concentration of the scattering particles can be 12% and the thickness of the light conversion material layer in the light conversion film is 105 microns so that the display device can reach a better display effect.

Optionally, in one embodiment, the light conversion film 102 includes a light conversion material. The light conversion material includes a quantum dot material and/or a fluorescent material. The quantum dot (QD) material means that three-dimensional sizes of a particle material are all nanoscale. A quantum dot can enter an excited state when irradiated by a light. Besides, when the quantum dot falls back to a ground state from the excited state, the quantum dot will emit a light having a specific wavelength (that is, a specific color). The emission spectrum of the quantum dot is controlled by the particle diameter of the quantum dot. Therefore, through changing the particle diameter of the quantum dot, the emission spectrum of the quantum dot can be adjusted. At the same time, the conversion efficiency of the quantum dot is very high, which can increase the light utilization rate. A half-wave width of the emission spectrum of the quantum dot is very narrow, the temperature stability is good. The material of the quantum dot can be a quantum dot material of group II-VI, group I-III-VI or a mixture of different quantum dot materials. Wherein, the quantum dot material of group II-VI means a compound formed by group II elements and group VI elements. The quantum dot material of group III-V and the quantum dot material of group are similarly. Specifically, the quantum dot material can be one or multiple of ZnCdSe2, CdSe, CdTe, CuInS2 and ZnCuInS3. The sizes and the material of the quantum dot and the kinds of the fluorescent material can be selectively adjusted.

Optionally, in one embodiment, a concentration ratio of the quantum dot material to the fluorescent material is 1:50~1:3. For example, the concentration ratio can be 1:50, 1:30, 1:10, 1:5 or 1:3. The light conversion efficiency of the quantum dot material is higher than a normal fluorescent material. However, the price of the quantum dot material is also higher than the price of the fluorescent material. If the entire light conversion film adopts the quantum dot material, the manufacturing cost will be increased. Besides, when the light conversion efficiency reach a preset value, even increasing the amount of the quantum dot material, the final display effect will not change much so that the resource is wasted. Accordingly, in the present embodiment, adopting a combination of the quantum dot material and the fluorescent material, the light conversion efficiency can be ensured, and also save the cost.

Optionally, in one embodiment, the backlight module adopts a blue light source to perform a light excitation. Because the excitation light source of the LED is a lambertian emitter, which can emit light in a unidirectional manner. That is, a light intensity of the LED is the greatest at a normal line of an emission surface, and the light intensity is decreased along with an angle away from the normal line such that at a large viewing angle, certain of color shift will be existed. To deal with the above problem, a ratio of the light conversion material and a ratio, sizes and kinds of the scattering particles can be adjusted to increase the scattering degree of the blue light in order to decrease the color shift problem at the large viewing angle of the backlight module. Wherein, the quantum dot material includes a green quantum dot material and a red quantum dot material. A concentration ratio of the green quantum dot material to the red quantum dot material is in a range of 3.5:1~1.2:1. Specifically, the green quantum dot material absorbs the blue light to emit a red light and a green light. However, the green light is easy to be absorbed by the red quantum dot material to emit a red light, and finally, when the above lights are mixed to generate a white light; a mixing ratio of the above color lights is not right such that a display is uneven. In order to reduce a secondary absorption of the green light, a concentration of the green quantum dot material is greater than a concentration of the red quantum dot material. The concentration ratio is 3.5:1, 2.7:1, 1.9:1, 1.5:1 and 1.2:1, etc.

Optionally, in one embodiment, in order to solve the color shift problem thoroughly, an ultraviolet light source can be adopted for excitation. The light conversion film 102 requires three colors of RGB photoluminescent materials. In the embodiment, the quantum dot materials include a blue quantum dot material, a green quantum dot material and a red quantum dot material. A mass ratio of the blue quantum dot material to the quantum dot material is in a range of 33%~75% such as 33%, 42%, 56%, 68% and 75%, etc. A mass ratio of the green quantum dot material to the quantum dot material is in a range of 12%~58% such as 12%, 23%, 35%, 47% and 58%, etc. A mass ratio of the red quantum dot material to the quantum dot material is in a range of 8%~35% such as 8%, 15%, 22%, 29% and 35%, etc. Through adjusting the mass ratios of the quantum dot materials, a better display effect can be reached. For example, a concentration of the blue quantum dot material is 63%, a concentration of the green quantum dot material is 26% and a concentration of the red quantum dot material is 11%.

Optionally, in one embodiment, the backlight module further includes one or multiple of a diffusion film, a brightening film, a reflective film, a transflective film, a dual brightness enhancement film (DBEF) and a prism film that condenses lights only in a vertical direction. The backlight module does not include a conventional prism film. Specifically, to make the light conversion film 102 to not condense the emitting lights, on the light conversion film 102, a prism film is not provided or providing a prism film that condenses lights only in a vertical direction. On the light conversion film 102, only providing a film that has a light diffusion function such as the diffusion film or the DBEF. With above situation, a one-third brightness viewing angle can be above 120 degrees, even 130 degrees. Furthermore, in order to have a better viewing angle effect, an upper surface of the light conversion film 102 does not provide with any film. In that situation, the one-third brightness viewing angle can be above 140 degrees, even 150 degrees, which greatly increase the viewing angle and the viewing experience.

Optionally, in one embodiment, the backlight module includes a reflective film layer, and the reflective film layer is disposed at a side of the light conversion film 102 away from the light source 101. A portion of the first light passes through the light conversion film 102 and emits on the reflective film layer. A portion of the emitted light is reflected back in order to continue to convert the first light into the second light. Through disposing the reflective film, when scattering a light, a portion of the light is reflected back to excite the light conversion material on order to emit a light. Accordingly, the number of the excitation is increased and the color temperature is decreased so as to increase the backlight brightness and obtain a better display effect.

Figure 3:
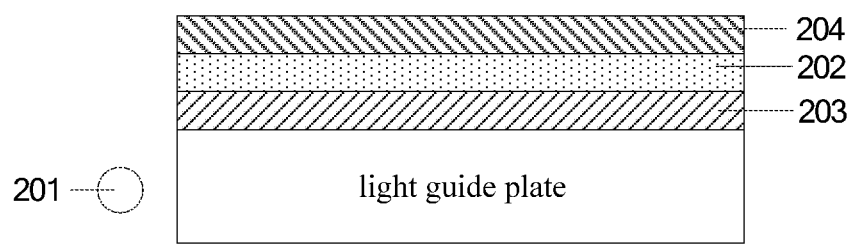
FIG. 3 is a schematic diagram of a backlight module according to another embodiment of the present invention.
Figure 4:
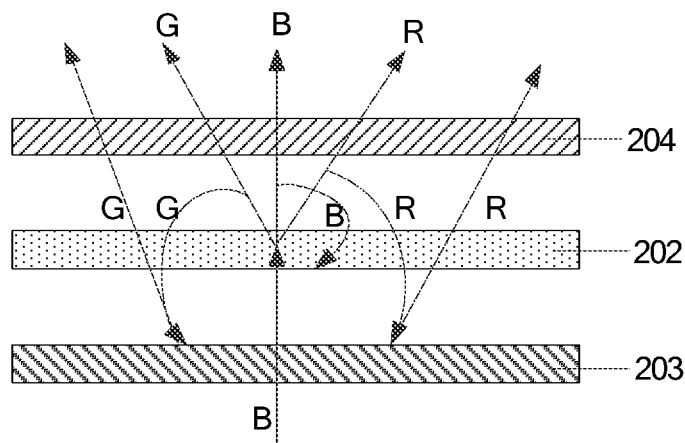
FIG. 4 is a schematic diagram of light directions of a backlight module according to another embodiment of the present invention.

With reference to FIG. 3 and FIG. 4, wherein, FIG. 3 is a schematic diagram of a backlight module according to another embodiment of the present invention, and FIG. 4 is a schematic diagram of light directions of a backlight module according to another embodiment of the present invention. In one embodiment, the backlight module further comprises a first transflective film 203 disposed at a side of a light conversion film 202 which is adjacent to a light source 201. The transflective film 203 can pass the first light and reflect the other light. A second transflective film 204 disposed at a side of the light conversion film 202 away from the light source 201. The second transflective film 204 can partially reflect the first light and pass the other light. Through disposing the first transflective film 203, the present invention can selectively pass the first light, increase the purity of the first light in order to enhance the excitation efficiency. The second transflective film can pass the other light which is the lights except the first light in order to form a white light to provide a backlight source, and the second transflective film can partially reflect the first light to generate the second light again in order to increase an utilization rate of the first light to enhance the light brightness. In another embodiment, the present invention can only dispose a transflective film at a side of the light conversion film 202 away from the light source.

Using a blue light source as an example, the first transflective film 203 can pass through a blue light (B), and reflect other lights except the blue light. The blue light is absorbed by the light conversion material, and the light conversion material is excited to generate a red light (R) and a green light (G). The red light and the green light and a portion of the blue light can be mixed through the second transflective film 204 to generate a white light in order to provide a backlight source. A portion of the red light and the green light cannot pass through the first transflective film 203 so as to be reflected to emit again in order to increase the light utilization rate. At the same time, a portion of the blue light is reflected back, and being absorbed by the light conversion material to excite the light conversion material again in order to increase the number of the excitation to increase the light utilization rate.

Optionally, in another embodiment, the backlight module can be a direct-light type light source to provide a backlight source for a display device.

Figure 5:
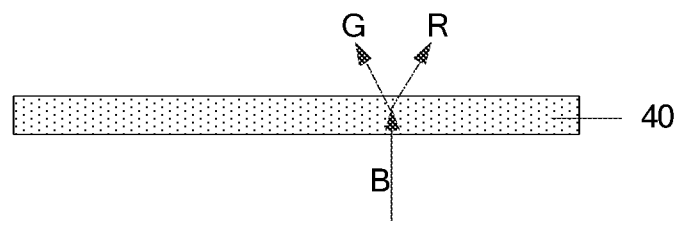
FIG. 5 is schematic diagram of a light conversion film used for a backlight module according to an embodiment of the present invention.

With reference to FIG. 5, and FIG. 5 is schematic diagram of a light conversion film used for a backlight module according to an embodiment of the present invention. The present invention further provide a light conversion film 40 for a backlight module, the light conversion film 40 receives a first light, converts the first light into a second light and emit the second light such that an emission angle of the backlight module is greater than 120 degrees and the color temperature is less than 15000. The light conversion film 40 is anyone of the light conversion film of the above embodiments, no more repeating. The light conversion film 40 also can be a film layer having a diffusing and brightening function.

Figure 6:
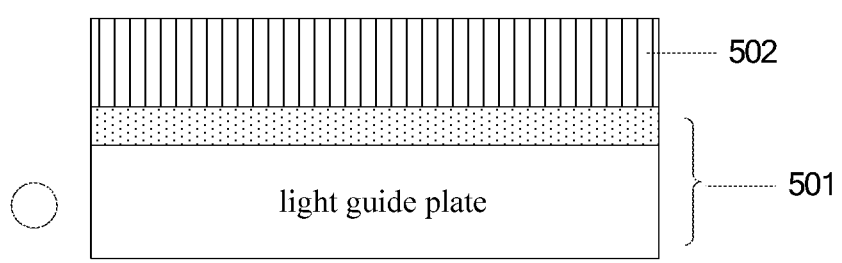
FIG. 6 is a schematic diagram of a display device according to an embodiment of the present invention.

With reference to FIG. 6, and FIG. 6 is a schematic diagram of a display device according to an embodiment of the present invention. The present invention provides a display device. The display device includes a backlight module 501 and a liquid crystal display panel 502. The structure of backlight module 501 is the same as the embodiments described above, no more repeating. The liquid crystal display panel 502 adopts a normal structure. The backlight module of the display device has a better emitting angle such that the display device has a wider viewing angle and better display effect.

In summary, the present invention provides a backlight module including a light conversion film, the light conversion film can make an emitting light to be emitted outward in an isotropic manner in order to increase an emitting angle of the backlight module, increase the viewing angle of the display device to be above 120 degrees. Besides, the light conversion film has a higher light excitation rate, which can decrease the color temperature of the backlight module, and increase the display effect.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A light conversion film for a backlight module, comprising:
a quantum dot material and/or a fluorescent material; and multiple scattering particles,
wherein, the light conversion film receives a first light, converts the first light into a second light and emits the second light such that a light emission angle of a backlight module is greater than 130 degrees, a color temperature is less than 12000 and a contrast ratio is greater than 2000:1.

2. The light conversion film according to claim 1, wherein, a concentration of the quantum dot material and/or the fluorescent material in the light conversion film is in a range of 0.05%~38%.

3. The light conversion film according to claim 1, wherein, a particle diameter of each of the multiple scattering particles is in a range of 0.5 microns~6.5 microns; a concentration of the multiple scattering particles in the light conversion film is in a range of 0.05%~47%.

4. The light conversion film according to claim 1, wherein, a concentration ratio of the quantum dot material and/or the fluorescent material to the multiple scattering particles is in a range of 1:1~1:10.

5. The light conversion film according to claim 1, wherein, a concentration ratio of the quantum dot material to the fluorescent material is in a range of 1:50~1:3.

6. The light conversion film according to claim 1, wherein, a thickness of the quantum dot material and/or the fluorescent material is in a range of 53 microns~162 microns.

7. A backlight module, comprising:
a light source that emits at least a first light;
a light conversion film that receives the first light, converts the first light into a second light and emits the second light such that a light emission angle of the backlight module is greater than 120 degrees and a color temperature is less than 15000.

8. The backlight module according to claim 7, wherein, the light emission angle of the backlight module is greater than 130 degrees, the color temperature is less than 12000 and a contrast ratio is greater than 2000:1.

9. The backlight module according to claim 7, wherein, the light conversion film includes a light conversion material, and a concentration of the light conversion material in the light conversion film is in a range of 0.05%~38%.

10. The backlight module according to claim 9, wherein, the light conversion film further includes multiple scattering particles, and a particle diameter of each of the multiple scattering particles is in a range of 0.5 microns~6.5 microns; a concentration of the multiple scattering particles in the light conversion film is in a range of 0.05%~47%.

11. The backlight module according to claim 9, wherein, the light conversion material includes a quantum dot material and/or a fluorescent material, and a concentration ratio of the quantum dot material to the fluorescent material is in a range of 1:50~1:3.

12. The backlight module according to claim 11, wherein, the quantum dot material includes a green quantum dot material and a red quantum dot material; a concentration ratio of the green quantum dot material to the red quantum dot material is in a range of 3.5:1~1.2:1; the quantum dot material further includes a blue quantum dot material; a concentration of the blue quantum dot material to the quantum dot material is 33%~75%; a concentration of the green quantum dot material to the quantum dot material is 12%~58%; and a concentration of the red quantum dot material to the quantum dot material is 8%~35%.

13. The backlight module according to claim 7, wherein, the light conversion film includes a light conversion material layer, and a thickness of the light conversion material layer is in a range of 53 microns~162 microns.

14. The backlight module according to claim 7, wherein, the backlight module further includes one or more of a diffusion film, a brightening film, a reflective film, a transflective film, a dual brightness enhancement film and a prism film that condenses lights only in a vertical direction, and the backlight module does not include a prism film.

15. A display device including a backlight module, wherein, the backlight module includes: a light source that emits at least a first light, and a light conversion film that receives the first light, converts the first light into a second light and emits the second light such that a light emission angle of the backlight module is greater than 120 degrees and a color temperature is less than 15000.

16. The display device according to claim 15, wherein, the light emission angle of the backlight module is greater than 130 degrees, the color temperature is less than 12000 and a contrast ratio is greater than 2000:1.

17. The display device according to claim 15, wherein, the light conversion film includes a light conversion material, and a concentration of the light conversion material in the light conversion film is in a range of 0.05%~38%.

18. The display device according to claim 15, wherein, the light conversion material includes a quantum dot material and/or a fluorescent material, and a concentration ratio of the quantum dot material to the fluorescent material is in a range of 1:50~1:3.

19. The display device according to claim 15, wherein, the backlight module further includes one or more of a diffusion film, a brightening film, a reflective film, a transflective film, a dual brightness enhancement film and a prism film that condenses lights only in a vertical direction, and the backlight module does not include a prism film.

* * * * *